United States Patent
Chan et al.

(10) Patent No.: US 8,245,271 B2
(45) Date of Patent: Aug. 14, 2012

(54) SCOPE-CENTRIC ACCESS CONTROL MODEL

(75) Inventors: Eric S. Chan, Fremont, CA (US); Vladimir Begun, Mountain View, CA (US); Ramkrishna Chatterjee, Nashua, NH (US); Ilya Teplov, Foster City, CA (US); Ramesh Vasudevan, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1013 days.

(21) Appl. No.: 11/839,146

(22) Filed: Aug. 15, 2007

(65) Prior Publication Data

US 2009/0049509 A1    Feb. 19, 2009

(51) Int. Cl.
*G06F 17/30* (2006.01)
(52) U.S. Cl. .......... 726/1; 726/3; 726/4; 726/11; 726/27
(58) Field of Classification Search ........................ 726/1
See application file for complete search history.

(56) References Cited

U.S. PATENT DOCUMENTS

| | | | |
|---|---|---|---|
| 7,308,496 B2* | 12/2007 | Yeager et al. | 709/224 |
| 7,318,237 B2* | 1/2008 | Moriconi et al. | 726/27 |
| 7,350,226 B2* | 3/2008 | Moriconi et al. | 726/1 |
| 7,624,145 B2* | 11/2009 | Junuzovic et al. | 709/205 |
| 2003/0115322 A1* | 6/2003 | Moriconi et al. | 709/224 |
| 2003/0115484 A1* | 6/2003 | Moriconi et al. | 713/201 |
| 2004/0088579 A1* | 5/2004 | Powers et al. | 713/201 |
| 2005/0257247 A1* | 11/2005 | Moriconi et al. | 726/2 |
| 2006/0047669 A1* | 3/2006 | Durrence et al. | 707/10 |
| 2007/0157288 A1* | 7/2007 | Lim | 726/1 |
| 2007/0169168 A1* | 7/2007 | Lim | 726/1 |
| 2007/0276768 A1* | 11/2007 | Pallante | 705/78 |
| 2007/0282951 A1* | 12/2007 | Selimis et al. | 709/205 |

* cited by examiner

*Primary Examiner* — Kambiz Zand
*Assistant Examiner* — Yonas Bayou
(74) *Attorney, Agent, or Firm* — Shun Yao; Park, Vaughan, Fleming & Dowler LLP

(57) ABSTRACT

Apparatus, methods, and computer program products are disclosed that maintain an association graph made up of association tuples. Each of the association tuples belongs to an access-control-policy scope that imposes an access control policy. On receipt of a client reference and a supplier reference a scope-defining entity is identified from the client reference. The scope-defining entity has an explicit access control policy. An effective supplier reference is retrieved from a set of the association tuples matching the scope-defining entity and is presented.

30 Claims, 6 Drawing Sheets

```
EmailEntity =>
        ID                    : immutable part EID
      ┌ Deleted               : boolean,
      │ Parent                : getParent():Entity,
      │ ViewerProperties      : privateProperties():{CollabProperty},
  401 ┤ Unread                : isUnread():boolean,
      │ New                   : isNew():boolean,
      └ Recent                : isRecent():boolean, ┌ [Name]                : string,
      │ [Owner]               : <Viewer>,
      │
      │ [Creator]             : immutable Ref<Actor>,
      │ CreatedOn             : immutable timestamp,
      │ ModifiedBy            : <Actor>,
  403 ┤ ModifiedOn             : timestamp,
      │ [UserCreatedOn]       : timestamp,
      │ [UserModifiedOn]      : timestamp,
      │ Properties            : {part CollabProperty},
      │ Sensitivity           : part Sensitivity,
      └ LocalAccessControlList : {part ACE},
      ┌ Body                  : part MimeConvertable,
      │ [Sender]              : part Participant,
      │ [DeliveredTime]       : timestamp,
      │ [Priority]            : part Priority,
  405 ┤ Receivers             : {part Participant},
      │ CCReceivers           : {part Participant},
      │ BCCReceivers          : {part Participant},
      └ ReplyTo               : {part Participant},
  407 ┤ References            : <Artifact>
```

FIG. 4

| R | Scope PID | Effective Supplier PID | "Given" Supplier PID |
|---|---|---|---|
| 1 | System-001 | Msg1-105 | Msg1-111 |
| 2 | System-001 | DocA1-106 | DocA1-106 |
| 3 | System-001 | DocA2-107 | DocA2-107 |
| 4 | System-001 | DocA3-108 | DocA3-108 |
| 5 | InboxB-021 | Msg1-109 | Msg1-111 |
| 6 | System-001 | Msg2-110 | Msg2-114 |
| 7 | InboxC-031 | Msg2-112 | Msg2-112 |
| 8 | System-001 | Msg3-113 | Msg3-113 |
| 9 | InboxB-021 | Msg3-115 | Msg3-115 |
| 10 | InboxB-021 | Msg2-116 | Msg2-114 |
| 11 | InboxB-021 | DocA1-117 | DocA1-106 |

SCOPE-CENTRIC ACCESS CONTROL MODEL

BACKGROUND

1. Technical Field

The disclosed technology relates to the field of controlling operations on computer accessible information within a scoped computing environment.

2. Background Art

An access control policy (ACP) is a set of policy statements of the form ("Subject", "Privilege", "Object") defining the privileges that the subject has to act on the object. The set of policy statements can be very large and difficult to administrate. Many systems use a hierarchy of Subjects, Assigned Privileges, and Objects to more concisely specify the access control policy. It is common to use "Groups" to represent sets of Subjects, "Roles" to represent named sets of Assigned Privileges, and "Containers" to represent sets of Objects. Example containers include Workspace, Folder, Inbox, etc. Some systems model Role as a mapping of Subjects to Assigned Privileges, and therefore, use the Roles to represent a grouping of Subjects and Assigned Privileges. The following is an example access control policy formulated in this policy model:

1. ProductManagementGroup is a Group that contains a set of Subjects {Bob, Tom, John}
2. ProductManagementRole is a Role that contains named set of Privileges {Create, Assign, Delegate, Close}
3. DemoWorkspace is a Container holding a set of Objects {DocumentDemoTaskList, EmailDemoTaskList, CalendarDemoTaskList}

The access control policy statement (ProductManagementGroup, ProductManagementRole, DemoWorkspace) is a concise statement that contains the policy statement tuples from the cross product of the three sets ({Bob, Tom, John}×{Create, Assign, Delegate, Close}, ×{DocumentDemoTaskList, EmailDemoTaskList, CalendarDemoTaskList}). Thus, there are 36 (3×4×3) policy statements defined by this access control policy statement.

Any of the Subjects Bob, Tom, and John can belong to more than one Group. A Privilege can be assigned through more than one Role. An Object can also belong in more than one Container. Thus, to determine whether a Subject has the Right to act on an Object, the authorization process of an access control model must evaluate policy statements from multiple Groups, Roles, and Containers.

An entity can be contained in a hierarchy of containers. The entity need not use explicitly specified Rights to the entity because often the Rights can be derived from the entity's container hierarchy (such as a workspace, an inbox, or a user folder). Examples of such a situation include message forward/reply chains and document hierarchies (including for example, document artifacts that are attached to message artifacts) as well as file systems or other hierarchical structures.

Many systems, especially collaboration systems, use the concept of the Scope that represents a managed environment to enforce the access control policy (and other policies for quota, template, and category) of the Scope in isolation from all other Scopes. A user can make persistent changes to the configurations (which include access control policies, other policies, sensitivities, quotas, templates, categories, etc.) and the scoped entities without interfering with the configurations and scoped entities in other Scopes. A Scope can be contained in a hierarchy of Scopes, but unlike the generic Containers, the Scope can belong in a single hierarchy of Scopes. Hence, there is no issue of multiply inheriting access control policies or any other type of policies for Scopes.

There are situations where it would be advantageous to evaluate whether a Subject has Rights to operate on an Object based on the Scope. To apply the Rights with respective to a Scope, one must follow a chain of client-supplier pairs from the supplier entity leading back to the Scope to consider the access control policy of each Container in the chain that grants or denies the subject's Rights to the entities in the Container. However, the number of access control policies can grow non-linearly because of combinatorial explosion in the enumeration of all chaining of client-supplier pairs to the supplier entity from the Scope when each of the access paths (chains) can introduce its own effective access control policy. In addition, the policy statements that must be evaluated increase non-linearly with increasing numbers of Objects, Subjects and Roles. This combinatorial explosion or non-linear growth problem has prohibited implementation of scope-centric access control models in any reasonably sized system. It would be advantageous to provide a scope-centric access control model that is not subject to the non-linear growth problem.

BRIEF DESCRIPTION OF THE FIGURES

FIG. 4 illustrates a data structure that represents an e-mail entity;

DETAILED DESCRIPTION

Figure 1:
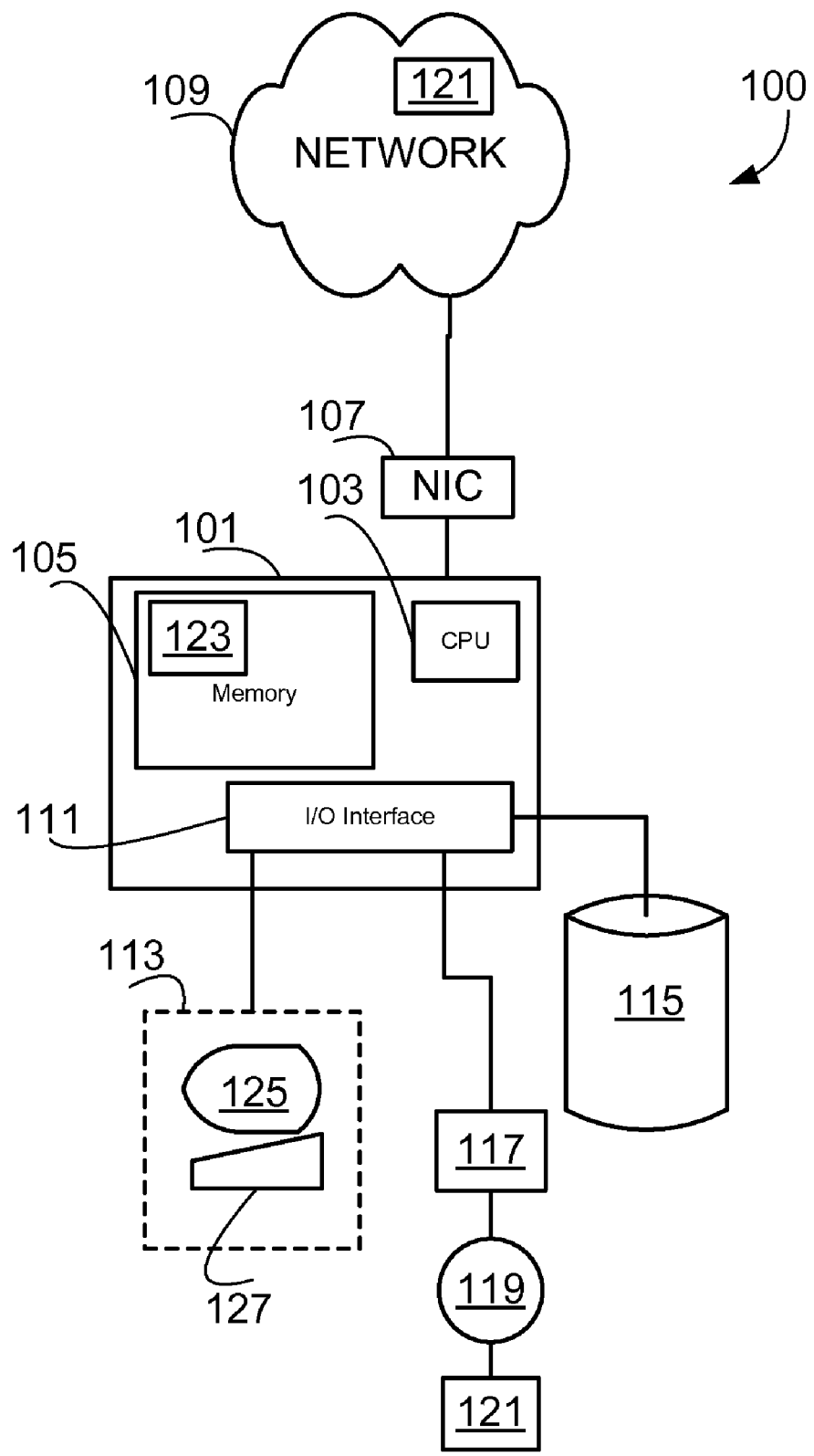
FIG. 1 illustrates a networked computer system in accordance with an embodiment.

One aspect of the technology disclosed herein is a computerized process that maintains an association graph made up of association tuples. Each of the association tuples belongs to an access-control-policy scope that imposes an access control policy. The process receives a client reference and a supplier reference and identifies a scope-defining entity from the client reference. The scope-defining entity has an explicit access control policy. The process then retrieves an effective supplier reference from a set of the association tuples that match the scope-defining entity and the effective supplier reference is presented. The process can be used by devices that include a processing unit. The process can be defined by computer instructions embodied within a computer readable media such that a computer after reading the instructions from the media can execute the instructions to cause the computer to perform the process.

The non-linear growth problem previously mentioned can be understood by examining a brute-force implementation of an association-maintenance-process. The association-maintenance-process can be applied when an Actor attempts to operate on a supplier entity via a client entity. The brute-force association-maintenance-process follows:

Step 1: Given a valid CollabId (that can contain or reference the client PID and the supplier PID), look up the association tuple in the association graph by the supplier PID. If found, compare the client PID in the association tuple with the client PID provided by the CollabId. If the client PIDs match, then return the supplier PID. If the client PIDs do not match, proceed to step 2.

Step 2: Create a new supplier PID and insert a new association tuple between the new supplier PID and the client PID provided by CollabId. In the association tuple, indicate that the previous supplier PID (the supplier PID from CollabId) is replaced by the new supplier PID. Return the new supplier PID from the new association tuple. Subsequent assertion of the same valid CollabId will return the new supplier PID from the new association tuple via step 1.

The brute-force association-maintenance-process described above will generate an association graph with the non-linear growth problem because of the combinatorial explosion resulting from enumerating all access paths to the supplier entity when each of the access paths can introduce its own access control policy. The inventors have developed an association-maintenance-process that does not have the non-linear growth problem demonstrated above.

Collaborative computing environments are one example where the use of the technology disclosed herein would be advantageous. The description of the technology is cast within the context of such an environment. However, the described technology can be used within other environments as well and the independent claims are not limited to collaborative computing environments.

One skilled in the art of collaborative computing environments will understand that an Enterprise is a scope entity at the root of a set of object graphs in the system. The Enterprise (a singleton) contains sub-Organizations, which in turn contain Workspaces, which can contain folders, mailboxes, etc. An artifact is an entity created within the environment (for example, document creation is a collaborative activity that defines an artifact—the document; an e-mail message is another example of an artifact). A container is a generic set of entities that hold other entities. A folder is an artifact that is a container for other entities (for example, calendars, address books, and user folders). Folders may represent entity hierarchies. Collaborative computing environments can be implemented using a database, a suitably-enabled file system, with file metadata, etc. to represent entities and relationships between entities. While the technology disclosed herein is described within a database-based collaborative computing environment, one skilled in the art will understand how to implement equivalent capability in other types of collaborative computing environments without undue experimentation.

For an illustrative collaborative computing environment that uses the scope-centric access control model described herein, an entity is an object that can be uniquely identified by a unique entity ID (EID). The unique entity ID can be assigned when the entity is created and is immutable. A proxy entity (subsequently termed a "proxy") is an entity that references another entity. An entity can be referenced by multiple proxies, each proxy having its own EID (subsequently termed a "proxy identification" or "PID"). The use of EID and PID—and entity and proxy—herein help clarify which type of entity is being discussed. The process of creating the entity is equivalent to instantiating the entity.

An entity generally contains metadata information, state information, and dependency information. The proxy, represented by the information data structures Entity_Proxy, for a given entity aggregates Entity_Metadata, Entity_State, and Entity_Dependency information data structures (or objects). More than one proxy for an entity can share these information data structures using "copy-on-write" mechanics. In some embodiments the Entity_Proxy and the Entity_Metadata information data structures (or objects) are mutable. In some embodiments, the Entity_State, and Entity_Dependency information are immutable once the entity is made immutable (for example when an entity is checked in as a version, delivered by the messaging service, or is a snapshot).

The inventors have recognized that in many situations, entity hierarchies need not use explicitly specified Rights to the entity because often the Rights can be derived from the entity's scope at the top of the container hierarchy (such as an inbox, calendar, or user workspace). Examples of such a situation include message forward/reply chains and document hierarchies (including for example, document artifacts that are attached to message or calendar artifacts) as well as file systems or other hierarchal structures.

Within a collaborative computing environment an actor operates on a supplier entity via a client entity. These operations on the supplier entity can include accesses to the data provided by the supplier entity (for example, by reading or editing a document artifact), as well as invoking a service on the supplier entity (such as by attaching a document artifact to an e-mail message artifact). The scope of a client entity can be defined by an entity that is subject to an explicit policy statement and that directly or indirectly contains the client entity.

The inventors have discovered that for such situations, the effective Rights determination can be represented by a direct association between the supplier entity and the scope of the client entity from which an actor operates on the supplier entity. Thus, all accesses to the supplier entity within the same scope are equivalent (that is, they may use the same EntityMetadata) without regard for the path taken to reach the supplier entity. Thus, an effective supplier proxy to the supplier entity can be associated with the scope and other proxies to the supplier entity can be aliased by that effective supplier proxy (an aliased supplier reference). In addition multiple scopes partition the proxies for the same supplier entity such that a partition contains aliases for the unique effective supplier proxy for the scope that owns the partition.

The scope-centric access control model enables new collaborative computing environment capabilities. For example, such an environment enables a Document_Demo_TaskList entity to be accessible through both a Demo_Workspace and a Document_Development_Workspace. Thus, developers and product managers can collaborate in developing and performing feature demonstrations of a "Document product". The scope-centric access control model can be configured to allow the development members of the Document_Development_Workspace to have the CREATE, ASSIGN, DELEGATE, and CLOSE Rights on the Document_Demo_TaskList entity through the scope corresponding to the Document_Development_Workspace; but, the same developers would only have the READ Right to the Document_Demo_TaskList entity from the scope corresponding to the Demo_Workspace. Thus, when the developers operate on the Document_Demo_TaskList entity from the Demo_Workspace, they would not have the Document_Development_Workspace Rights, but only the Rights available to the developer from the Demo_Workspace. This interpretation of the access control policy is compatible with the "principle of least privileges", and is related to the capability for enabling or disabling roles and the "separation of duties", which is defined using mutually exclusive roles.

The technology described herein can be used with a computer system similar to that described with respect to FIG. 1.

FIG. 1 illustrates a networked computer system 100 that can incorporate an embodiment of the disclosed technology. The networked computer system 100 includes a computer 101 that incorporates a CPU 103, a memory 105, and a network interface 107. The network interface 107 provides the computer 101 with access to a network 109. The computer 101 also includes an I/O interface 111 that can be connected to a user interface device(s) 113, a storage system 115, and a removable data device 117. The removable data device 117 can read a computer-usable data carrier 119 (such as a fixed or replaceable ROM within the removable data device 117 itself (not shown); as well as a computer-usable data carrier that can be inserted into the removable data device 117 itself (such as a memory stick, CD, floppy, DVD or any other tangible media) that typically contains a program product 121. The user interface device(s) 113 can include a display device 125 and a user input device 127. The storage system 115 (along with the removable data device 117), the computer-usable data carrier 119, and (in some cases the network 109) comprise a file storage mechanism. The program product 121 on the computer-usable data carrier 119 is generally read into the memory 105 as a program 123 which instructs the CPU 103 to perform specified operations. In addition, the program product 121 can be provided from devices accessed using the network 109. One skilled in the art will understand that the network propagates information (such as data that defines a computer program). Signals can be propagated using electromagnetic signals, visible or invisible light pulses, signals on a data bus, or signals transmitted over any wire, wireless, or optical fiber technology that allows information to be propagated from one point to another. Programs and data are commonly read from both tangible physical media (such as those listed above) and from the network 109. Thus, the network 109, like a tangible physical media, can be a computer-usable data carrier. One skilled in the art will understand that not all of the displayed features of the computer 101 need to be present for all embodiments that implement the techniques disclosed herein. Further, one skilled in the art will understand that computers are ubiquitous within modern devices ranging from as cell phones to vehicles to kitchen appliances etc. The technology disclosed herein can be used with the networked computer system 100 or any computer system on or off a network.

One aspect of the technology disclosed herein is a scope-centric access control model that determines an Actor's Rights for operations on a supplier entity via a client entity (for example, a specific workspace, folder, electronic message, etc.). These Rights can be specified by an explicit access control policy statement on the scope-defining entity directly or indirectly containing the client entity. Thus, instead of determining Rights from the union of access control policy statements from multiple inheritance paths (an approach that is vulnerable to the non-linear growth problem), the scope-centric access control model computes Rights to a supplier entity (for example, Privileges and Access Types) based on the scope of the client entity that is used to operate on the supplier entity.

The scope-centric access control model maintains an association graph comprising association tuples between the scope and supplier entities (in some embodiments the association tuple contains or references proxy PIDs for the scope and supplier entities). Association tuples can be added to the association graph when determining an Actor's Rights to a supplier entity via a client entity.

The inventors have developed an association-maintenance-process that determines the transitive closure of the associations between the scope and the supplier entity via the client entity. The association-maintenance-process does not materialize association tuples in the association graph that represent intermediate associations on the path between the scope and the supplier entity. Thus, the association graphs for such a situation are not subject to the non-linear growth problem. The association-maintenance-process is subsequently described with respect to FIG. 3.

Figure 2:
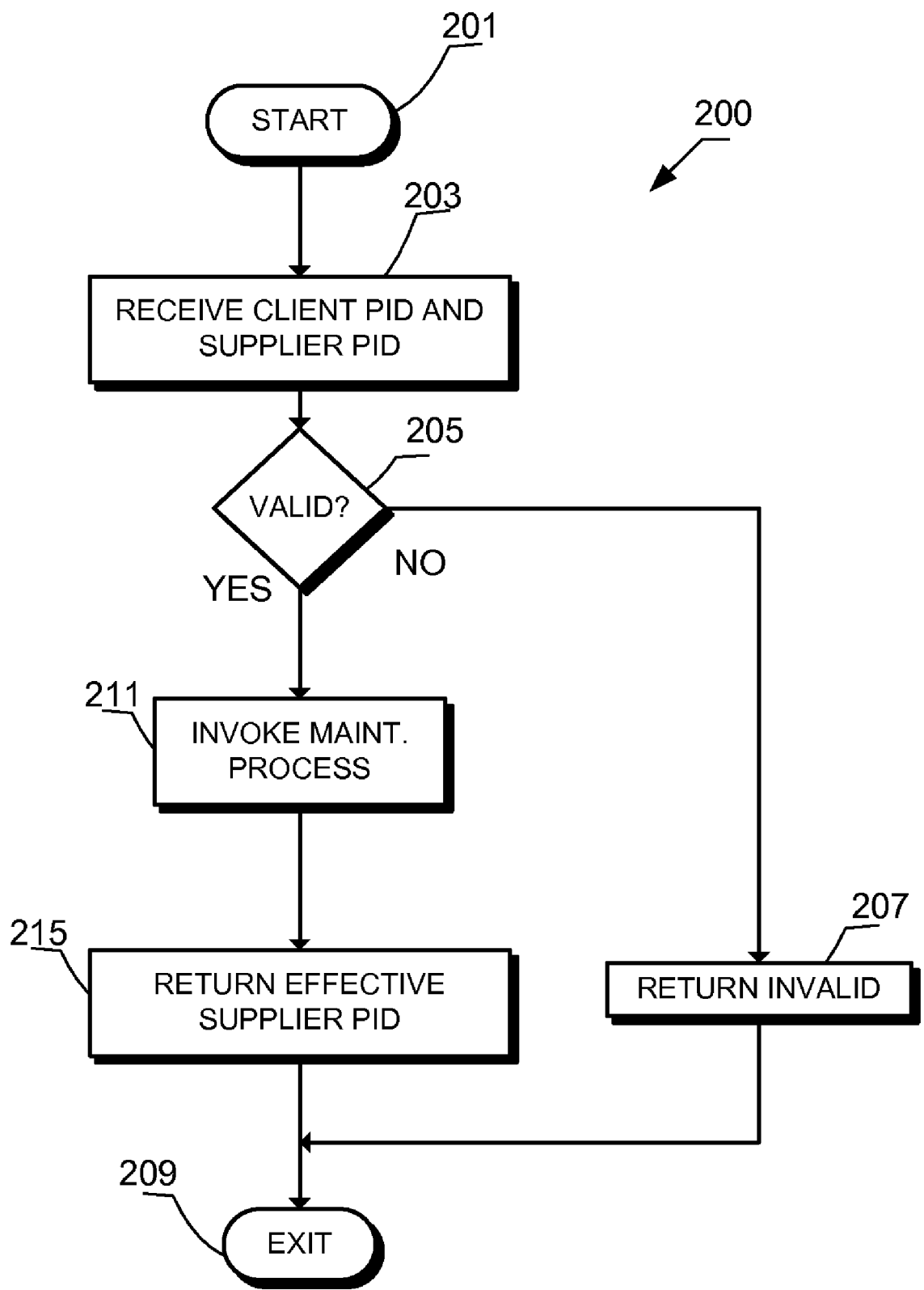
FIG. 2 illustrates an overview of the operation of a scope-centric access control model process.

We first describe the association-maintenance-process as a sequence of steps (for which an embodiment is described with respect to FIG. 3); prove the process' advantages and characteristics; and then describe one example implementation of a system that uses the described association-maintenance-process with reference to FIG. 2. Finally we describe example capabilities that are enabled by the association-maintenance-process and detail one messaging embodiment. One skilled in the art will understand the equivalence between the association graph used in the description of the steps and the object graph used by the Proof.

The scope-centric access control model can be applied when an Actor submits a request to operate on a supplier entity via a client entity. The request includes a client reference and a supplier reference (for example, an Actor can invoke an editor within workspaceA (the client that contains a reference to a file) to access the file (the supplier of the data to be edited by the Actor)). In one embodiment, the client reference is a client PID and the supplier reference is a supplier PID for the respective entities. These PIDs can be contained in (or directly or indirectly identified by) a data structure termed "CollabId" in the following descriptions. The scope-centric access control model processes the request and presents (returns) an effective supplier reference (possibly different from the submitted supplier reference) that can be used to determine the Actor's Rights to operate on the supplier entity via the client entity.

In one embodiment, application of the association-maintenance-process (on the client PID and the supplier PID specified by the received CollabId) returns an effective supplier reference such as a supplier PID for the supplier entity. The effective supplier reference is responsive to the client entity's scope and the supplier entity. The supplier proxy identified by the supplier PID includes or references the access control policy that specifies the Actor's Rights to operate on the supplier entity via the client entity. As operations are requested, the association-maintenance-process captures the scopes of the client entities and associates the scopes with the effective supplier PID in an association graph. The association graph includes association tuples that include a scope field that identifies a proxy for a scope-defining entity, an effective supplier field that identifies an effective supplier PID of a proxy that has the same Rights with respect to the scope-defining entity as a requested supplier entity, and a given supplier field that identifies a proxy for a requested supplier entity. If the effective supplier PID is different from the PID for the proxy for the requested supplier entity, the proxy for the requested supplier entity is aliased by the effective supplier proxy and the effective supplier PID is the aliased supplier reference.

The association-maintenance-process assumes a valid combination of the client entity and the supplier entity. A validity determination can be made after receiving the client reference and the supplier reference prior to examining the association graph to determine whether the supplier entity can be operated on by the Actor via the client entity. One embodiment uses a validity check such as:

Validity Check: The goal of the validity check is to protect the system against spoofing. Assume a CollabId which contains or references the client PID and the supplier PID where, via the client entity referenced by the client PID, the Actor desires to operate on the supplier entity referenced by the given supplier PID. The validity check is applied if the client PID and the given supplier PID do not match one of the tuples directly, i.e. the client PID and the given supplier PID do not match the scope field and effective supplier field, respectively, of an association tuple. In one embodiment the CollabId is validated by verifying that the entity dependency (subsequently described with respect to Table 4) associated with the client PID actually contains the given supplier PID as an indication of dependency on the supplier entity. If the entity dependency does not contain the reference, the scope-centric access control model rejects the CollabId request.

The association-maintenance-process can be applied to identify an Actor's Rights to operate on a supplier entity via a client entity and to maintain the association graph. The request can be defined using a client PID and a supplier PID for the respective entities. The association-maintenance-process returns an effective supplier-proxy identifier that can be used to determine the Actor's Rights with respect to the scope and supplier entity via the client entity. The steps for one embodiment of the association-maintenance-process are:

Step 1: Given a valid CollabId request (that can contain or reference the client PID and the supplier PID), use the client PID and traverse backward through the parent field of the EntityProxy in the successive nodes of the chain of client entities (parent field of the EntityProxy is subsequently described with respect to Table 1), to find the nearest Container entity (traversing toward the Container hierarchy root) that has an explicit access control policy (for example, a workspace, inbox, system folder, version storage, version history, or other Container that has an explicit access control policy). This Container is a scope-defining entity that defines one of a plurality of access-control-policy scopes. Note the scope-defining entity PID.

Step 2: Use the supplier PID from the CollabId to look up an association tuple in the association graph that has a matching supplier PID in the effective supplier field. If such an association tuple exists, compare the scope PID from the scope field of that association tuple with the scope-defining entity PID from step 1. If the scope PID and the scope-defining entity PID from step 1 match, return the supplier PID from the CollabId as the effective supplier-proxy identifier. Otherwise, proceed to step 3.

Step 3: Note the supplier PID from the CollabId as the given supplier PID. Look for any association tuple whose scope PID matches the scope-defining entity PID of step 1 and whose effective supplier field contains a supplier PID that identifies the same supplier entity as the supplier entity identified by the given supplier PID (for example from FIG. 5 and FIG. 6, PIDs "Msg2-110" and "Msg2-114" reference the same entity "Msg2"). If no such association tuple is found, proceed to step 4. Otherwise add the given supplier PID from the CollabId to the given supplier field to indicate that the given supplier PID from the CollabId is "aliased" by the effective supplier PID in the effective supplier field and return the effective supplier PID as the effective supplier-proxy identifier. Note that the effective supplier field and the given supplier field can contain identical supplier PIDs.

Step 4: To reach this step either the client PID from the CollabId must match the scope-defining entity PID from step 1 or the client PID must be an effective PID that is associated directly with the scope-defining entity PID from step 1. Note the supplier PID from the CollabId as the given supplier PID. If the PID in the Parent field (the EntityProxy representing the parent entity) of the given supplier EntityProxy does not match the client PID from the CollabId, proceed to step 5. If the PID of the Parent EntityProxy of the given supplier EntityProxy matches the client PID from the CollabId then insert a new association tuple between the scope-defining entity PID from step 1 and the supplier PID from the CollabId, and then return the supplier PID from the CollabId as the effective supplier-proxy identifier. Subsequent assertion of the same valid CollabId will return the supplier PID from the effective supplier field via step 2.

Step 5: To reach this step either the client PID from the CollabId must match the scope-defining entity PID from step 1 or the client PID must be an effective PID that is associated directly with the scope-defining entity PID from step 1. Note the supplier PID from the CollabId as the given supplier PID.

If the PID in the Parent field (the EntityProxy representing the parent entity) of the given supplier EntityProxy does not match the client PID from the CollabId, then create a new aliased supplier proxy and add the client PID from the CollabId into the Parent field of the new proxy (parent field of the EntityProxy is subsequently described with respect to Table 1).

Insert a new association tuple between the scope-defining entity PID from step 1 and the new alias supplier PID of the new aliased supplier proxy. In the association tuple, indicate that the given supplier PID (by storing the given supplier PID in the given supplier field) is aliased by the new alias supplier PID in the effective supplier field. Return the new alias supplier PID from the effective supplier field as the effective supplier-proxy identifier. Subsequent assertion of the same valid CollabId will return the contents of the effective supplier field via step 3.

Note that only steps 4 and 5 of the association-maintenance-process add a new association tuple to the association graph and then only when an operation on a supplier entity is first requested. If an operation on the supplier entity has been previously requested, step 2 will detect and use the previously created association tuple. If the same supplier entity has been previously operated on from another path in the same scope, step 3 will find the association tuple for the previous path from the same scope and add the given supplier PID from the CollabId into the given supplier field of the association tuple. By doing so, the given supplier PID becomes an alias of the effective supplier PID and step 3 then uses the previously created association tuple.

The previously described association-maintenance-process resulted from the inventors' discovery of the following relationships (wherein the term "loaded" is equivalent to "operated on", and "association graph" is equivalent to "object graph"):

Theorem I: The number of association tuples created by the association-maintenance-process grows linearly with the number of supplier entities in the object graph. At any time after loading m supplier entities out of M supplier entities comprising an object graph, m association tuples will be present.

Proof: We prove Theorem I by induction over repeated executions of the association-maintenance-process previously described. Without loss of generality, we focus on one access control policy Container (a scope-defining entity) and apply the induction on the traversal of the object graph from that Container. Before any supplier entity from the object graph is loaded, there are zero association tuples to any entity of the object graph with respect to that Container in question.

Basis: Let us denote the Container by PID "WorkspaceA-100". The entity dependency structure of WorkspaceA-100 must contain a reference to at least one supplier entity in the object graph. Let us denote this supplier entity by PID "ArtifactB-101".

For the basis, we claim that there is one association tuple for ArtifactB from WorkspaceA-100 when the client actor loads the supplier ArtifactB-101, via the client WorkspaceA-100, using the CollabId (Client=workspaceA-100, Supplier=ArtifactB-101). There are three cases when applying the association-maintenance-process to the request for this CollabId.

Case 1: In this case, the PID of the Parent EntityProxy of the supplier EntityProxy represented by the supplier PID ArtifactB-101 exactly matches the client PID WorkspaceA-100. If ArtifactB is loaded for the first time from WorkspaceA-100, step 4 will create an association tuple (WorkspaceA-100, ArtifactB-101, ArtifactB-101). There was no previous association tuple except the one added by step 4. Therefore, one association tuple for ArtifactB from WorkspaceA-100 is present.

Case 2: In this case, the PID of the Parent EntityProxy of the supplier EntityProxy represented by the supplier PID ArtifactB-101 does not match the client PID WorkspaceA-100. If ArtifactB is loaded for the first time from WorkspaceA-100, step 5 will create a new aliased supplier proxy and insert a new association tuple (workspaceA-100, ArtifactB-iii, ArtifactB-101) where iii is different from 101. There was no previous association tuple for WorkspaceA-100 except the one added by step 5. Therefore, one association tuple for ArtifactB from WorkspaceA-100 is present.

Case 3: If the ArtifactB was loaded previously, then there must be an association tuple (WorkspaceA-100, ArtifactB-nnn, - - - ) for some nnn. If ArtifactB-nnn is identical to ArtifactB-101, i.e. nnn=101 (WorkspaceA-100, ArtifactB-101, ArtifactB-101), then step 2 will return ArtifactB-101. If ArtifactB-nnn is not identical to ArtifactB-101, which is the case when ArtifactB was previously loaded from a different path within the same scope (but by a different proxy nnn), then step 3 will return ArtifactB-nnn and indicate that ArtifactB-101 is an alias of ArtifactB-nnn (WorkspaceA-100, ArtifactB-nnn, ArtifactB-101). No new association tuple is added. Therefore, one association tuple for ArtifactB aliased by the effective PID ArtifactB-nnn from WorkspaceA-100 is present.

Hence for the basis, there is only one association tuple for ArtifactB from WorkspaceA-100.

Induction: Assume that there are n association tuples present after loading n supplier entities. After loading these n entities, let us now suppose that the actor requests an arbitrary supplier, which we denote by "SupplierD-kkk", via the client, which we denote by "ClientC-jjj", using the CollabId (client=ClientC-jjj, supplier=SupplierD-kkk), where ClientC-jjj is one of the n previously loaded entities from the object graph. By assumption, there is an association tuple from WorkspaceA-100 to ClientC-jjj (either by direct association or by an alias to another, effective proxy ClientC-iii, where iii is different from jjj).

There are three cases, depending on whether the arbitrary supplier entity, denoted by "SupplierD", is being loaded for the first time or is one of the n previously loaded entities.

Case 1: In this case, the PID of the Parent EntityProxy of the supplier EntityProxy represented by the supplier PID SupplierD-kkk exactly matches the client PID ClientC-jjj. Suppose SupplierD is loaded for the first time from WorkspaceA-100. SupplierD is the $(n+1)^{th}$ entity to be loaded from WorkspaceA-100. Since ClientC-jjj is among the previous n entities loaded, step 4 will find that ClientC is already associated with workspaceA-100 by an association tuple (workspaceA-100, ClientC-jjj, ClientC-jjj), i.e. ClientC-jjj is the effective PID with respect to the scope WorkspaceA-100. Hence step 4 creates a new association tuple (WorkspaceA-100, SupplierD-kkk, SupplierD-kkk). SupplierD-kkk is the $(n+1)^{th}$ entity to be loaded from WorkspaceA-100. Therefore, after n+1 entities are loaded, there are n+1 association tuples present.

Case 2: In this case, the PID of the Parent EntityProxy of the supplier EntityProxy represented by the supplier PID SupplierD-kkk does not match the client PID ClientC-jjj. Suppose SupplierD is loaded for the first time from WorkspaceA-100. Since ClientC is among the previous n entities loaded, step 5 will find that ClientC is already associated with WorkspaceA-100 by an association tuple (WorkspaceA-100, ClientC-jjj, ClientC-jjj), i.e. ClientC-jjj is the effective PID with respect to the scope WorkspaceA-100. Hence step 5 creates a new aliased supplier proxy and inserts a new association tuple (workspaceA-100, SupplierD-rrr, SupplierD-kkk) between the scope-defining entity from step 1 and the new aliased supplier, which is SupplierD-rrr where rrr is different from kkk. SupplierD-rrr is the $(n+1)^{th}$ entity to be loaded from WorkspaceA-100. Therefore, after n+1 entities are loaded, there are n+1 association tuples present.

Case 3: Suppose SupplierD was previously loaded from WorkspaceA-100. By the assumption of the inductive step, there must be an association tuple (WorkspaceA-100, SupplierD-ppp, - - - ) for some ppp, among the n association tuples present. If ppp=jjj (WorkspaceA-100, SupplierD-jjj, SupplierD-jjj), we know that SupplierD is previously loaded by the same proxy, thus step 2 will return SupplierD-jjj. If ppp is different from jjj, we know that SupplierD was previously loaded by a proxy ppp which is different from proxy jjj. Thus step 3 will add the SupplierD-jjj as an alias for SupplierD-ppp to reuse the same association tuple (WorkspaceA-100, SupplierD-ppp, SupplierD-jjj). Step 3 then returns SupplierD-ppp without adding a new association tuple. Therefore, n association tuples are present when there are n entities previously loaded.

If n association tuples are present after loading n entities, n+1 association tuples will be present after loading n+1 entities, i.e. after the $(n+_1)^{th}$ entity is loaded for the first time.

Hence by induction we proved that for any n, n association tuples are present when n entities are loaded. QED.

Corollary II: If there are M supplier entities comprising an object graph accessible from N different access control policy Containers or Scopes (for example, users' workspaces or inboxes), then at most N*M association tuples will be created by the association-maintenance-process. If we include the system Container (for example, the system folder), which (in some embodiments) is the primary access control policy Container, then there are M additional association tuples from the system Container. Therefore, there are at most (N*M)+M association tuples for an object graph comprised of M supplier entities, N access control policy Containers, and 1 system Container.

Proof: All association tuples created by the association-maintenance-process for any number of access control policy Containers can be partitioned into disjoint sets. Each set is comprised of association tuples whose scope PID fields contain the same PID representing the access control policy Container that defines the scope. As a consequent of Theorem I, if M supplier entities comprise the object graph, then at most M association tuples will be associated with any Container, depending on how many entities are actually loaded from that Container. In other words, each partition of the association tuples identified by a Container will contain at most M association tuples. If we load the object graph from N different Containers, there are at most N partitions and therefore at most N*M association tuples will be present. If we include the system Container, at most M association tuples can come from the system Container. Therefore, there are at most (N*M)+M association tuples present. QED.

The system Container and the access control policy Containers define the set of access control policy scopes. Each Supplier proxy is directly associated with a Scope or aliased to a Supplier proxy that is directly associated with a Scope. In some embodiments, the association is via the PIDs of the corresponding proxies.

One skilled in the art, after reading the technology disclosed herein will understand that in the situation where the supplier entities are protected by explicit access control policies on each level of the hierarchy of containers, the association-maintenance-process proved above produces the same result as the brute-force association-maintenance-process and in such a situation would also have the non-linear growth problem. However, the new association-maintenance-process is advantageous in situations where the access control policy of a supplier entity is derived only from explicit access control policies on the scope at the top of the hierarchy of containers and any optional explicit access control policy on the supplier entity (that is, the access control policies of the intervening containers between the scope and the supplier entity, if present, are excluded from the effective access control policy). In these situations, the non-linear growth problem is mitigated by not having to enumerate all implied paths to an entity from the scope.

One skilled in the art, after reading the technology disclosed herein, will understand that once an entity is loaded, that entity is identified by the PID of an effective proxy with respective to a scope from which the entity is loaded. In addition, one skilled in the art will understand that the entity references in a CollabId can be composed by taking the PID of an effective client proxy that contains an entity dependency structure (subsequently described with respect to Table 4) and taking a supplier PID from one of the fields in the entity dependency structure. One skilled in the art will also understand that the PID of the effective proxy of a supplier entity can be bookmarked, by bonds, labels, etc., and that one can compose a CollabId with a bookmarked effective supplier PID without providing the client PID, in which case the client PID is assumed to be provided by the PID in the parent field of the effective supplier proxy.

FIG. 2 illustrates a scope-centric access control model process 200 that initiates at a start terminal 201 and that continues to a 'receive operation request' procedure 203 that receives a client reference and a supplier reference (such as a client PID and a supplier PID separately, or within a CollabId data structure etc.) for which the scope-centric access control model process 200 is to provide the invoker with an effective supplier reference from which the invoker can determine whether the Actor can operate on the supplier entity via the client entity. Once the client PID and the supplier PID are received, the scope-centric access control model process 200 continues to a 'valid request' decision procedure 205 that validates the client PID and the supplier PID combination as was previously described. If the request is not valid, the scope-centric access control model process 200 continues to a 'prepare error return' procedure 207 that prepares an appropriate error response and the scope-centric access control model process 200 returns the error response and completes through an exit terminal 209.

However, if the 'valid request' decision procedure 205 determines that the client PID and the supplier PID combination is valid, the scope-centric access control model process 200 continues to an 'association-maintenance-process' procedure 211 that performs the previously described process and for which an embodiment is subsequently described with respect to FIG. 3. Once the 'association-maintenance-process' procedure 211 determines an effective supplier-proxy identifier to return, the scope-centric access control model process 200 continues to a 'prepare effective return PID' procedure 215 that prepares the return value. The scope-centric access control model process 200 returns the effective supplier-proxy identifier return value and completes through the exit terminal 209.

Turning now to describing one embodiment of the association-maintenance-process; FIG. 3 illustrates an association-maintenance-process 300 that can be invoked by the 'association-maintenance-process' procedure 211 of FIG. 2, initiates at a start terminal 301 and continues to an 'identify controlling scope' procedure 303 that performs the process previously described with respect to step 1 of the association-maintenance-process and obtains a scope-defining entity PID of the nearest Container that has an explicit access control policy (traversing toward the root of the Container hierarchy). Next, the association-maintenance-process 300 continues to an 'association exists' decision procedure 305 that determines whether an association exists between the client PID and the supplier PID from the CollabId received by the 'receive operation request' procedure 203 (such as by matching the scope-defining entity PID with the association tuple's scope field and the supplier PID from the CollabId and the association tuple's effective supplier field). If so, the association-maintenance-process 300 continues to a 'prepare return of supplier PID' procedure 307 that prepares the supplier PID for return to the scope-centric access control model process 200 and the association-maintenance-process 300 completes through an exit terminal 309.

However, if the 'association exists' decision procedure 305 determines that no association tuple exists that directly matches the scope-defining entity PID and the supplier PID from the CollabId, the association-maintenance-process 300 continues to an 'effective supplier PID exists' decision procedure 311 that determines whether any association tuple exists whose scope PID matches the scope-defining entity PID and whose effective supplier field contains a supplier PID that identifies the same supplier entity as the supplier entity identified by the given supplier PID. In some embodiments this association can be determined by verifying, for example that the EID "Msg1" for the PID "Msg1-111" matches EID "Msg1" of the PID "Msg1-109" by looking at the EID embedded in the proxy's EntityMetadata or EntityState.

If so, a 'mark supplier PID' procedure 313 notes the association tuple found, adds the given supplier PID from the CollabId to the given supplier field of the association tuple found, and indicates that the supplier PID provided by the CollabId is not being used and the association-maintenance-process 300 continues to a 'prepare return of effective supplier PID' procedure 315 that prepares the effective supplier PID for return as the effective supplier-proxy identifier. The association-maintenance-process 300 then completes through the exit terminal 309.

However, if the 'effective supplier PID exists' decision procedure 311 determines that the scope-defining entity PID and the supplier entity identified through the supplier PID from the CollabId are not associated through any other effective supplier PID in any association tuple in the association graph, the association-maintenance-process 300 continues to a 'new proxy needed' decision procedure 317.

The 'new proxy needed' decision procedure 317 determines whether the PID in the Parent field (the EntityProxy representing the parent entity) of the given supplier EntityProxy match the client PID from the CollabId. If this condition is true, a new proxy is not needed but a new association tuple is needed.

If the 'new proxy needed' decision procedure 317 determines that a new proxy is not needed, the association-maintenance-process 300 continues to an 'insert new association' procedure 319 that inserts a new association tuple into the association graph that associates the scope-defining entity PID and the supplier PID from the CollabId. The association-maintenance-process 300 continues to a 'prepare return of supplier PID' procedure 321 that prepares the supplier PID from the CollabId for return as the effective supplier-proxy identifier and completes through the exit terminal 309.

If the 'new proxy needed' decision procedure 317 determines that a new proxy is needed, the association-maintenance-process 300 continues to a 'create new effective supplier proxy' procedure 323 that creates a new proxy for the same supplier entity identified by the supplier PID provided in CollabId, and places the client PID provided in CollabId into the parent field of the new proxy. Next the association-maintenance-process 300 continues to an 'insert new association with new supplier proxy' procedure 325 that inserts an association tuple having the scope-defining entity PID in its Scope PID field and the new supplier PID for the supplier entity in the Supplier PID field. Next a 'mark supplier PID' procedure 327 (similar to the 'mark supplier PID' procedure 313) indicates that the supplier PID provided by CollabId is not being used and the association-maintenance-process 300 continues to a 'prepare return of new effective supplier PID' procedure 329 that prepares the new supplier PID for the supplier entity for return as the effective supplier-proxy identifier. The association-maintenance-process 300 then completes through the exit terminal 309 as previously described.

When the 'mark supplier PID' procedure 313 and the 'mark supplier PID' procedure 327 add the supplier PID into the given supplier field and indicate that the supplier PID provided by CollabId is not being used, the invoker of the scope-centric access control model process 200 will receive the effective supplier-proxy identifier. The invoking program can then use the returned effective supplier-proxy identifier to determine the client entity's Rights to operate on the supplier entity. In addition, the returned effective supplier-proxy identifier can be used for subsequent requests (for example, the retuned effective supplier-proxy identifier can be bookmarked for later use, etc.).

In some embodiments, the 'effective supplier PID exists' decision procedure 311 uses the IDs of the EntityMetadata or EntityState of the supplier EntityProxy represented by the given supplier PID and the IDs of the EntityMetadata or EntityState of the supplier EntityProxy represented by the PID in the effective supplier field to determine whether the proxies are aliases (that is, whether the effective supplier proxy can be used as an alias for the given supplier proxy identified by the supplier PID from CollabId). In some other embodiments, the alias condition can be determined by verifying, for example that entity ID "Msg1" for the proxy ID "Msg1-111" matches entity ID "Msg1" of the proxy ID "Msg1-109" by looking at the entity ID embedded in EntityMetadata or EntityState.

The association-maintenance-process 300 can be performed eagerly or lazily (for example when the communication artifact (message, invitation, attachment) is sent or when the communication is accessed for the first time by or for a recipient).

When the effective supplier-proxy identifier is returned by the scope-centric access control model process 200, the invoking routine can use the proxy's AccessControlList field to determine whether the Actor can operate on the supplier entity via the client entity.

Having shown that the association-maintenance-process avoids the non-linear growth problem that has, until now, limited the use of scope-centric access control models, the Inventors have determined that a scope-centric access control model can use the scope of the client entity to determine the Rights the Actor has to operate on a supplier entity via the client entity. The inventors have also determined that the scope-centric access control model is a viable access control model for situations where implied access protection is commonly used. Examples of such situations include messaging and calendaring systems. In such systems, the scope-centric access control model enables optimization of message artifacts, calendar artifacts, and attachment artifacts thereof by enabling delivery of proxies to multiple recipients where the operations allowed to each recipient is responsive to the recipient's current scope. The access control policy of the scope exclusively determines the sensitivity, delegation, and other Rights on the artifacts. The inventors use such a message processing system as an exemplary embodiment.

In the subsequently described exemplary message processing system, the association graph captures associations between a supplier entity and the different scopes of the client entities used to operate on the supplier entity. The different scopes can include, for example, the recipient's workspaces, inboxes, or other client entities that "contain" or reference the supplier entity.

The exemplary message processing system makes the original message immutable when it is sent (for example, by copying the original message to a system Container owned by the System Actor, or by associating the message's unique entity ID with that Container and taking ownership of that immutable copy, or by leaving the original message in the sender's Folder but having the System Actor take ownership, etc.), and delivers proxies of the message (and proxies of the attachments to the message) to the message recipients. Using the proxy, a recipient can operate on the message or message attachments (for example, by reading the message, forwarding the message, replying to the message etc.). The recipient's Rights to operate on the message are responsive to the recipient's scope when the operation is requested. The recipient need not be aware that the message processing system provided a proxy for the message. Using copy-on-write mechanics, the recipient can copy, print, forward, delete, the message etc. as if a copy of the entity was provided instead of a proxy for the entity. However, the original copy of the message is immutable and so can be retrieved if needed. Furthermore, attachments to the message are not copied. Instead, proxies to the attachment are included. The recipient can also open, save, copy, edit, version, change priorities to (if allowed) etc. the document via the provided proxy.

In particular, the System Actor has the WRITE_ACL Privilege on the immutable message and attachment entities in the system Container. This allows the System Actor to adjust sender-specified Rights for the recipients. Thus, the System can enforce whether the sender or System Actor has allowed reply and forward Rights to the recipients explicitly on the message prior to allowing the recipient to forward or reply to the message.

Although a recipient can change the Rights on his/her inbox to allow other viewers to access the message and attachments in the inbox, the recipient does not have the WRITE_ACL privilege to change or override the Rights specified by the sender of the received message and/or attachment.

In some embodiments, the message sender does not have the (WRITE_ACL or ownership) to change the explicit access control policy on the email entity, proxies, metadata, state (subsequently described with respect to Tables 1-4 in the context of an email entity discussed with respect to FIG. 4) and thus to change the Rights he/she has given to the recipients when the message was sent. Thus, for email messaging the message, its attachments, and the Rights are immutable and owned by the system actor. It is not possible for the sender to retract the sent e-mail or attachments, or change the Rights that are available to the recipients of the message.

When the same message or attachment is received from multiple forwarded or replied-to messages, the system can identify the messages and attachments by the unique entity ID associated with the sender or recipient's scope. This allows a search engine to identify the messages and attachments in different parts of the forwarded and replied-to message chains by a unique entity ID relative to the same scope. Thus, instead of returning multiple hits in a search result, the search engine can return one hit and enumerate all paths from the same scope that can be used to reach the same message or attachment. The search engine can also correlate the attachments across the email messages, calendar invitations, and task assignments in the same scope or workspace.

The exemplary message processing system uses the disclosed technology to provide scope-centric access to email messages and attachments. One aspect of the exemplary message processing system is that it factors an email entity into four components: EmailProxy, EmailMetadata, EmailState, and EmailDependency.

TABLE 1

| EmailProxy => | |
|---|---|
| ID | immutable part PID, |
| AccessControlList | {part ACE}, |
| Deleted | boolean, |
| Parent | getParent( ):Entity, |
| ViewerProperties | privateProperties( ):{CollabProperty}, |
| Unread | isUnread( ):boolean, |
| New | isNew( ):boolean, |
| Recent | isRecent( ):Boolean, |
| Metadata | part ref EmailMetadata, |
| State | part ref EmailState, |
| Dependency | part ref EmailDependency |

FIG. 4 illustrates an e-mail entity 400 that includes identification information 401, e-mail metadata information 403, e-mail state information 405 and e-mail dependency information 407. A proxy entity for the e-mail entity 400 is shown in Table 1. The proxy entity includes the identification information 401 (however, remember that the PID of the proxy entity is a different value from the EID of the e-mail entity 400), and three fields that reference structures as shown in Tables 2-4.

The e-mail entity 400 can have multiple uniquely identified proxies (each EmailProxy having its own unique PID). The separate proxies can be used to determine the Rights to the e-mail entity 400 responsive to the scope of a client entity used to operate on the e-mail entity 400. The Email Proxy aggregates the EmailMetadata, EmailState, and EmailDependency information from the e-mail entity 400. More than one EmailProxy may share the EmailMetadata, EmailState, and EmailDependency objects using copy-on-write mechanics. In some embodiments, the EmailProxy and EmailMetadata can be mutable. In some embodiments, the EmailState and EmailDependency are immutable once the e-mail entity 400 is sent. (In some of these embodiments, the e-mail entity 400 can be placed in the system Container, i.e. the primary container of the email entity would be the system Container and the system actor that owns the system Container would also own the email entity.)

The AccessControlList in the EmailProxy specifies Rights to Operate on the email entity via a particular client entity. The Parent field identifies the EntityProxy of the parent entity (i.e. the Parent field contains the PID of parent EntityProxy) of the email entity represented by this Email Proxy. The parent entity is usually the Inbox that contains the email entity, or another email entity that depends on or references the current email entity. The ViewerProperties field contains a list of viewer (Actor) specific properties that can be used to decorate the e-mail entity 400 when displayed (saved, or otherwise). One skilled in the art will find the other fields in Table 1 to be self explanatory.

TABLE 2

| EmailMetadata => | |
|---|---|
| EntityClass | <EntityClass>, |
| [Name] | string, |
| [Owner] | <Viewer>, |
| [Creator] | immutable Ref<Actor>, |
| CreatedOn | immutable timestamp, |
| ModifiedBy | <Actor>, |
| ModifiedOn | timestamp, |
| [UserCreatedOn] | timestamp, |
| [UserModifiedOn] | timestamp, |
| Properties | {part CollabProperty}, |
| Sensitivity | part Sensitivity |
| AccessControlList | {part ACE} |

Table 2 illustrates one embodiment of an EmailMetadata data structure that can serve as a decorator for the EmailState (see Table 3). The EmailMetadata captures the mutable attributes that decorate the e-mail entity 400. Multiple EmailMetadata structures may be joined with the same EmailState when composing the email represented by the EmailProxy. The Sensitivity field can be used, for example, to specify whether the message is PUBLIC, PRIVATE, CONFIDENTIAL, etc. The AccessControlList in the EntityMetadata has higher affinity (closer distance to the entity than) the AccessControlList on the EntityProxy so that the AccessControlList of EntityMetadata can override that of the EntityProxy. For example, the AccessControlList of the EntityMetadata can specify the REPLY, FORWARD, COPY Rights for the email recipients. The email recipients can change the AccessControlList of the EntityProxy that they own but cannot override the AccessControlList in the EntityMetadata. The Properties field can be used to specify options for decorating the email. One skilled in the art will find the other fields in Table 2 to be self explanatory.

TABLE 3

| EmailState => | |
|---|---|
| Body | part MimeConvertable, |
| [Sender] | part Participant, |
| [DeliveredTime] | timestamp, |
| [Priority] | part Priority, |
| Receivers | {part Participant}, |

TABLE 3-continued

EmailState =>

| | |
|---|---|
| CCReceivers | {part Participant}, |
| BCCReceivers | {part Participant}, |
| ReplyTo | {part Participant} |

Table 3 illustrates one embodiment of the Email State structure that provides state information about the e-mail entity 400 represented by the Email Proxy. In some embodiments, once the e-mail entity 400 is made immutable, the state components of EmailState also become immutable. The EmailState can be owned by the System Actor. If the EmailState is shared by a proxy that represents a mutable entity (one that has a live proxy), it is necessary to clone the Email State for the live proxy before the state can be modified. This operation is known as the copy-on-write operation.

TABLE 4

EmailDependency =>

| References | <Artifact> |
|---|---|

Table 4 illustrates one embodiment of the EntityDependency structure that captures the containment hierarchy of the e-mail entity 400. For example, when a document is attached to a message, according to the send-by-copy semantics, the system can create a snapshot of the document. If the attached document contains other documents, the system traverses the containment hierarchy to create snapshots for each of the documents. (For example, in the subsequent description, the EntityDependency structure can associate DocZ1, DocZ2, DocZ3, and MsgZ.)

Some embodiments can use a Deep-Copying process on an entity. Deep-Copying substitutes entity references in the copied entity with proxy references that share the same metadata and state components with other proxies (subject to copy-on-write).

Figure 3:
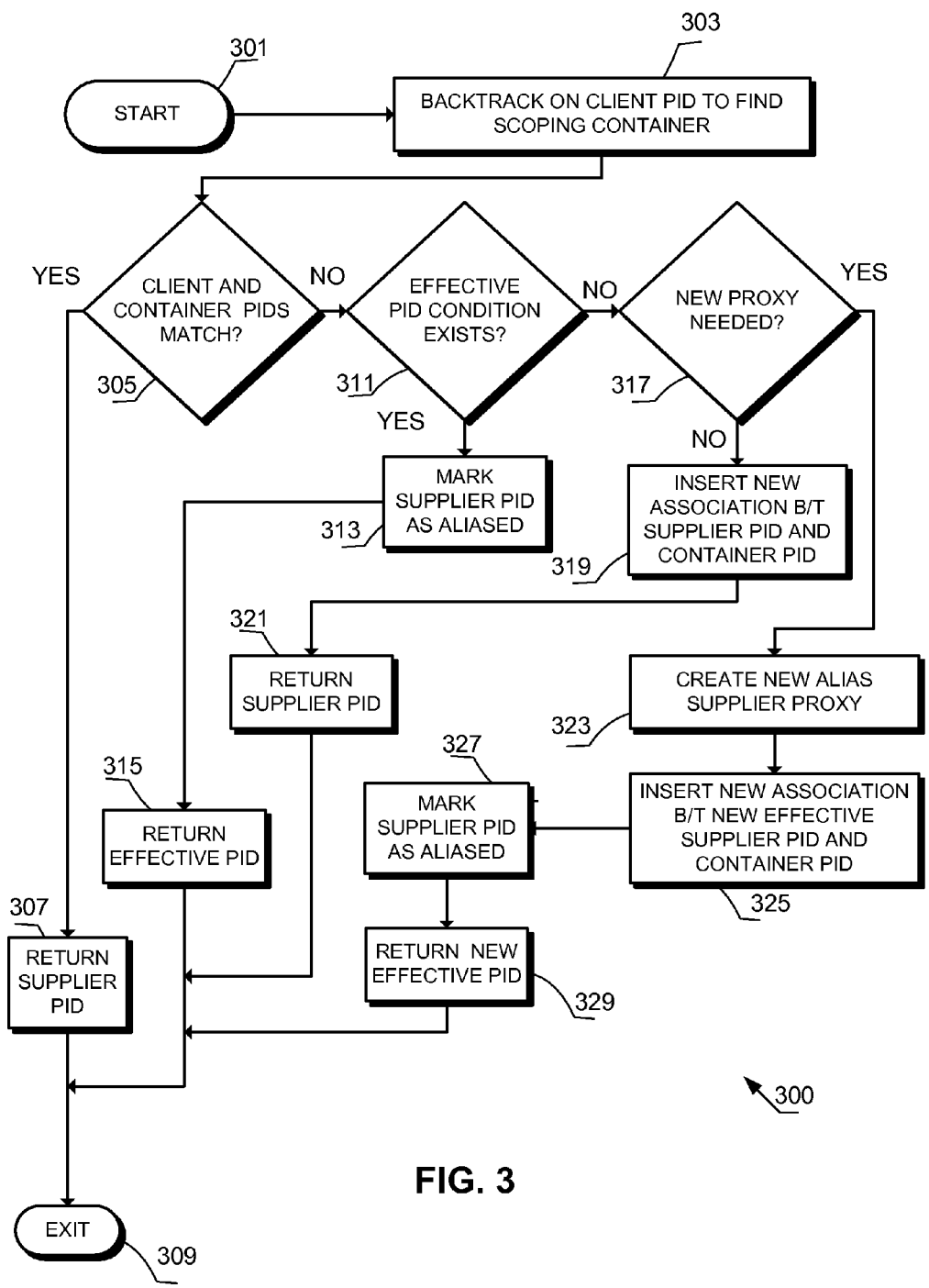
FIG. 3 illustrates one embodiment of the association-maintenance-process used in FIG. 2.
Figure 6:
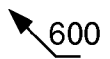
FIG. 6 illustrates a table representing the association graph corresponding to FIG. 5.

Assume the following sequence of operations in a message processing system that incorporates the processes of FIG. 2 and FIG. 3. Assume a system folder and two inboxes. Each of the inboxes and the system folder are controlled by explicit Rights and thus, each defines a scope: Assume the PID for the system folder is "System-001"; assume that User B's workspace has a proxy InboxB-021 for User B's inbox having a PID of "InboxB-021" and User C's workspace has a proxy for User C's inbox having a PID of "InboxC-031". For this example the outbox, sent box etc. for users A and B are not relevant and not further discussed. FIG. 6 provides an illustration of the association graph resulting from the following sequence of Operations. References to the association tuples are of the form "(#)" where "#" is a number from 1-11. The association tuples are identified in FIG. 6 by these numbers to identify the association tuple discussed during the subsequent example.

1) User A sends a message (MsgZ) to User B, MsgZ includes an attachment document (DocZ1) that includes two other documents (DocZ2 and DocZ3). The system makes immutable copies of DocZ1 (DocA1), DocZ2 (DocA2), DocZ3 (DocA3), and of MsgZ (Msg1). The original attachment documents are left in User A's file system and are no longer relevant to this example. The system also takes ownership of the immutable copies. In some embodiments, the system need not actually copy the files, but can instead take ownership of the user's file states, make them immutable, and provide proxies to the user as required.

2) the system creates proxies (Msg1-105, DocA1-106, DocA2-107, and DocA3-108) for the immutable copies now owned by the System. The PIDs for the attachments ("DocA2-107" and "DocA3-108") to DocA1 are included in the EntityDependency component of DocA1 whose proxy is DocA1-106. The PID for DocA1-106 ("DocA1-106") is contained in the EntityDependency component for Msg1 whose proxy Msg1-109 is sent to User B's inbox (InboxB for which proxy InboxB-021 resides in User B's workspace). The email delivery system (in some embodiments the step 4 of the association-maintenance-process) generates the association tuples (1) and (5), step 4 of the association-maintenance-process generates the association tuples (2), (3), and (4), and step 3 of the association-maintenance-process subsequently updates the third column of the association tuples (1) and (5).

3) User B forwards User A's message to User C via Msg2. Now, the system stores an immutable copy of Msg2, generates a new proxy for Msg1 (Msg1-111), generates a corresponding proxy Msg2-110, whose EntityDependency component contains the reference or dependency on "Msg1-111", for the System, generates a proxy Msg2-112 for Msg2, and sends Msg2-112 to User C's inbox (InboxC for which proxy InboxC-031 resides in User C's workspace). Assuming compatible Rights, User C could access the Msg2 through Msg2-112 with Rights defined by the scope of InboxC-031. From Msg2-112, User C could access Msg through Msg1-111, and from Msg1, can access DocA1 etc. Step 3 of the association-maintenance-process updates the association tuple (5) by adding Msg1-111 in the third column, while either the email delivery system or step 4 of the association-maintenance-process generates association tuple (6) and association tuple (7). Step 3 subsequently adds Msg2-114 into the third column of the association tuple (6).

4) Assume User C replies to User B's forwarded message: again, the system makes an immutable copy of Msg3 and creates the system proxy Msg3-113. The system also creates proxy Msg2-114, includes "Msg2-114" in the dependency structure for Msg3 and creates proxy Msg3-115 that is sent to InboxB. Either the email delivery system or step 4 of the association-maintenance-process generates association tuples (8), and (9).

Figure 5:
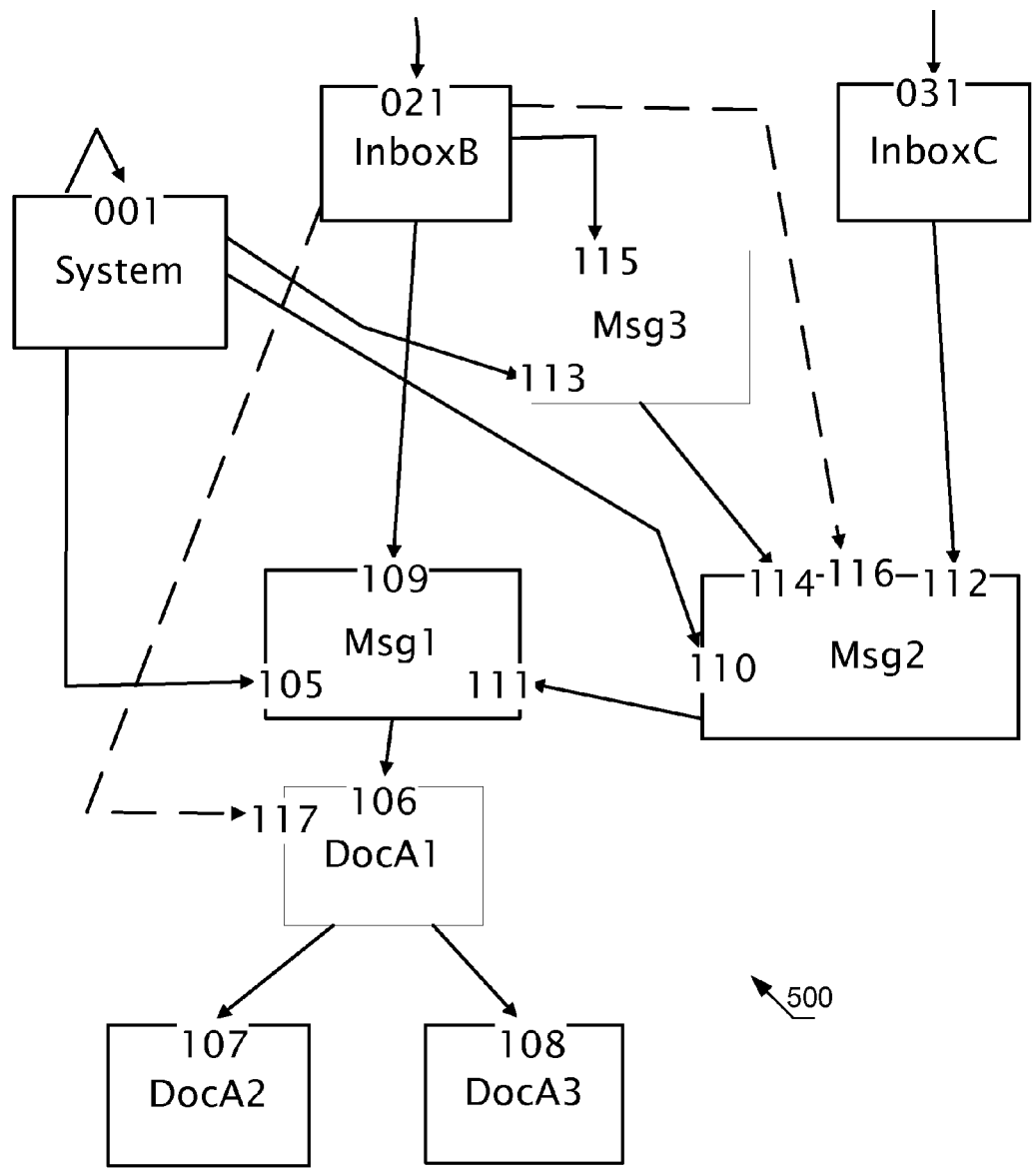
FIG. 5 is a graphical representation of the state of the association graph after an example exchange of messages.

FIG. 5 illustrates a representation of the association graph state 500 resulting from the operations previously and subsequently described. The entities and proxies are labeled on FIG. 5. The entities are represented by boxes and the proxies (generated by the previously described operations) are represented by solid arrows extending from a client entity to a supplier entity and identified by the number at the head of the arrow that represents the proxy (for example, the arrow that extends from InboxB to the entity Msg1, represents the proxy having a PID of "Msg1-109"). Thus, the labels and numbers on the boxes identify the proxies that reference the entity. For example, looking at Msg1, Msg1-105 is a proxy that represents the system as a client entity and Msg1 as a supplier entity. Msg1-111 is a proxy that represents Msg2 as a client entity and Msg1 as a supplier entity. The proxies generated by the subsequently described operations are represented by dashed arrows.

5) Now assume User B accesses Msg3 via Msg3-115 and then attempts to access Msg2 through Msg3-115->Msg2-114. In determining User B's Rights, and finding that parent entity of the proxy Msg2-114 is the proxy Msg3-113, which means that the message proxy Msg2-114 is created for System-001, the association-maintenance-process by means of step 5 creates a proxy Msg2-116 and generates association tuple (10) that represent InboxB as a scope entity and Msg2 as a supplier entity (the dashed arrow between InboxB and Msg2). Thus, Msg2-116 represents the Rights equivalent of User B accessing Msg2 through Msg3-115->Msg2-114.

6) Now assume User B accesses DocA1 through Msg1 as Msg1-109->DocA1-106. In determining User B's Rights to DocA1 from Msg1, a CollabId (client="Msg1-109", supplier="DocA1-106") is evaluated. Because the parent entity of the proxy DocA1-106 is Msg1-105, which means that the document proxies are created for System-001, as opposed to client PID Msg1-109 from the CollabId, step 5 creates a new proxy DocA1-117 and an association tuple (11) that associates the aliased PID DocA1-117 with Scope PID InboxB-021 and shows that the given supplier PID DocA1-106 is aliased by PID DocA1-117 with respect to scope InboxB-021, as represented by the dashed line between InboxB and DocA1.

FIG. 6 illustrates an association graph 600 that results from the application of the association-maintenance-process previously described. The association graph 600 is presented in table form with each row representing one association tuple. The association tuple includes a scope field, an effective supplier field and a given supplier field as labeled. The "R" label identifies the association tuple by a number for discussion purposes. One skilled in the art will understand that the access-control-policy scopes are indicated by "System-001", "InboxB-021", and "InboxC-031", each of which names a proxy for a scope-defining entity. A "CollabId" of the form (client="Msg3-115", supplier="Msg2-114") would resolve to the effective PID "Msg2-116". Thus, the Rights of User B and his/her delegatees to access Msg2 via InboxB can be determined by examining the access control list of the proxy identified by Msg2-116.

In some embodiments the use of a proxy is transparent to a User and appear as an object (for example, a proxy for a file object can have the same name and characteristics as the original file such that a User would be unable to distinguish between the file and the file proxy).

As used herein, a procedure is a self-consistent sequence of steps that can be performed by logic implemented by a programmed computer, specialized electronics or other circuitry or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic or combination of the foregoing. In particular, such a one will understand that such logics includes a fixation logic, an identification logic, an insertion logic, an instantiation logic, a presenting logic, a receiving logic, a retrieving logic, a search logic, a selection logic, a specification logic, a storage mechanism, a matching logic, and a tuple insertion logic etc. The device/computer also includes a storage mechanism for the association graph that can be any type of, or combination of, random access memory, file storage memory, read only memory or other storage.

One skilled in the art will understand that the network carries information (such as informational data as well as data that defines a computer program). The information can also be propagated using a carrier-wave. Signals capable of propagating the information includes electromagnetic signals, visible or invisible light pulses, signals on a data bus, or signals propagated over any wire, wireless, or optical fiber technology that allows information to be transmitted over a network. Programs and data are commonly read from both tangible physical media (such as a compact, floppy, or magnetic disk) and from a network. Thus, the network, like a tangible physical media, is a computer-usable data carrier.

One skilled in the art will understand that the technology disclosed herein enables the use of scope-centric access control models without the non-linear growth problem that result from brute-force techniques.

From the foregoing, it will be appreciated that the technology has (without limitation) the following advantages:

1) The disclosed technology supports multiple inheritances of Rights on the subject axis (groups), on the privilege axis (roles), and on the object (container) hierarchies even in non-trivial systems.
2) The disclosed technology can be used to exclusively evaluate the access control policy of the container (such as a workspace). Thus, the technology enables easy definition of a named set of objects and deployment of an access control policy for the named set of objects exclusively and independently of access control policies on other containers of the same objects.
3) The disclosed technology provides administrators with a Rights definition capability based on Scope. Thus, the administrative complexity is intermediate between fine-grained entity-by-entity control and course-grained control based on a single container hierarchy.
4) The disclosed technology enables the same access control model to be uniformly used for all entities. Thus, the disclosed technology efficiently and uniformly uses the same access control model for artifacts, containers, documents, email messages, calendar invitations, task assignments, document attachments, calendar artifacts, etc.
5) The disclosed technology enables the use of a workspace as the administrative boundary for the access control policy for all artifacts within the workspace. The principle of least privileges and separation of duty characteristics can be designed into the access control policy of the workspace and exclusively applied.
6) The technology disclosed herein significantly simplifies the access control of artifacts and improves data security because an artifact can be placed into any container (a logical region of administrative domain) to be governed by that container's access control policy.
7) The disclosed technology is applicable to any computer application that uses an access control policy. Such applications include, for example but without limitation, collaboration systems, message processing systems, and content management systems as well as data storage systems, databases, transaction systems etc.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported

What is claimed follows:

1. A computer-controlled method comprising:
maintaining, by a computer, a plurality of association tuples, wherein each association tuple is associated with an access-control-policy (ACP)-defining container which corresponds to one or more resources and is associated with an access control policy;
receiving a request to access a resource for a user, the request including a supplier reference to the resource, wherein the resource belongs to multiple ACP-defining containers having different explicit access control policies;
identifying a container which contains the requested resource, wherein the access control policy associated with the identified container grants the user access to the requested resource; and
granting the user access to the resource.

2. The computer-controlled method of claim 1, wherein the request further includes a client reference to a client entity used by the user to access the resource; and
wherein said client reference is a client-proxy identifier, said supplier reference is a supplier-proxy identifier, and said effective supplier reference is an effective supplier-proxy identifier.

3. The computer-controlled method of claim 1, wherein said container is identified by a container-proxy identifier, and each of said set of said plurality of association tuples contains said container proxy-identifier.

4. The computer-controlled method of claim 1, wherein the retrieving determining further comprises adding a new association tuple to said set of said plurality of association tuples.

5. The computer-controlled method of claim 1, wherein the determining comprises:
matching said supplier reference with one of said plurality of association tuples in said set of said plurality of association tuples; and
using said supplier reference as said effective supplier-proxy identifier.

6. The computer-controlled method of claim 1, wherein the determining comprises:
matching said supplier reference with an aliased supplier reference from said set of said plurality of association tuples; and
using said aliased supplier reference as said effective supplier reference.

7. The computer-controlled method of claim 2, wherein the determining further comprises:
determining that said client reference matches a parent entity of said supplier reference; and
adding a new association tuple to said association graph, said new association tuple referencing said supplier reference and said identified container.

8. The computer-controlled method of claim 2, wherein the determining further comprises:
determining that said client reference does not match a parent entity of the supplier reference;
creating a new alias supplier proxy for the resource; and
adding a new association tuple to said association graph, said new association tuple referencing said new alias supplier proxy.

9. The computer-controlled method of claim 1, further comprising:
creating a proxy to the resource, said proxy identified by a proxy identifier;
making the resource immutable; and
providing said proxy identifier as said supplier reference.

10. The computer-controlled method of claim 1, further comprising:
determining a right of the user to said effective supplier reference responsive to returning the effective supplier reference; and
enabling an operation by the user on said supplier reference responsive to said right.

11. An apparatus comprising:
a processor;
a memory;
a storage mechanism that maintains a plurality of association tuples, wherein each association tuple is associated with an access-control-policy (ACP)-defining container which corresponds to one or more resources and is associated with an access control policy;
a receiving logic that receives a request to access a resource for a user, wherein the request includes a supplier reference to the resource, wherein the resource belongs to multiple ACP-defining containers having different explicit access control policies;
an identification logic that identifies a container which contains the requested resource, wherein the access control policy associated with the identified container grants the user access to the requested resource; and
granting the user access to the resource.

12. The apparatus of claim 11, wherein the request further includes a client reference to a client entity used by the user to access the resource; and
wherein said client reference is a client-proxy identifier, said supplier reference is a supplier-proxy identifier, and said effective supplier reference is an effective supplier-proxy identifier.

13. The apparatus of claim 11, wherein said container is identified by a container proxy-identifier, and each of said set of said plurality of association tuples contains said container proxy-identifier.

14. The apparatus of claim 11, wherein the retrieving logic further comprises an insertion logic that adds a new association tuple to said set of said plurality of association tuples.

15. The apparatus of claim 11, wherein the retrieving logic further comprises:
a search logic that matches said supplier reference with one of said plurality of association tuples in said set of said plurality of association tuples; and
a selection logic that, responsive to the search logic, selects said supplier reference as said effective supplier-proxy identifier.

16. The apparatus of claim 11, wherein the retrieving logic further comprises:
a search logic that matches said supplier reference with an aliased supplier reference from said set of said plurality of association tuples; and
a selection logic that, responsive to the search logic, selects said aliased supplier reference as said effective supplier reference.

17. The apparatus of claim 12, wherein the retrieving logic further comprises:
a matching logic that determines that said client reference matches a parent entity of said supplier reference; and
a tuple insertion logic that, responsive to the identification logic, adds a new association tuple to said association graph, said new association tuple referencing said supplier reference and said identified container.

18. The apparatus of claim 12, wherein the retrieving logic further comprises:

a matching logic that determines that said client reference does not match a parent entity of the supplier reference;

an instantiation logic that creates a new alias supplier proxy for the resource; and a tuple insertion logic that, responsive to the identification logic and the instantiation logic, adds a new association tuple to said association graph, said new association tuple referencing said new alias supplier proxy.

19. The apparatus of claim 11, further comprising:

an instantiation logic that creates a proxy to the resource, said proxy identified by a proxy identifier;

a fixation logic that makes the resource immutable; and a specification logic that provides said proxy identifier as said supplier reference.

20. The apparatus of claim 11, further comprising:

a rights determination logic that, responsive to the presenting logic returning the effective supplier reference, determines a right of the user to said effective supplier reference; and an enablement logic that enables an operation by the user on said supplier reference responsive to said right.

21. A computer program product comprising:

a non-transitory computer-readable medium storing instructions that, when executed by a computer, cause said computer to perform a method, the method comprising:

maintaining a plurality of association tuples, wherein each association tuple is associated with an access-control-policy (ACP)-defining container which corresponds to one or more resources and is associated with an access control policy;

receiving a request to access a resource for a user, the request including a supplier reference to the resource, wherein the resource belongs to multiple ACP-defining containers having different explicit access control policies;

identifying a container which contains the requested resource, wherein the access control policy associated with the identified container grants the user access to the requested resource; and granting the user access to the resource.

22. The computer program product of claim 21, wherein the request further includes a client reference to a client entity used by the user to access the resource; and wherein said client reference is a client-proxy identifier, said supplier reference is a supplier-proxy identifier, and said effective supplier reference is an effective supplier-proxy identifier.

23. The computer program product of claim 21, wherein said container is identified by a container proxy-identifier, and each of said set of said plurality of association tuples contains said container proxy-identifier.

24. The computer program product of claim 21, wherein the determining further comprises adding a new association tuple to said set of said plurality of association tuples.

25. The computer program product of claim 21, wherein the determining comprises:

matching said supplier reference with one of said plurality of association tuples in said set of said plurality of association tuples; and using said supplier reference as said effective supplier-proxy identifier.

26. The computer program product of claim 21, wherein the determining comprises:

matching said supplier reference with an aliased supplier reference from said set of said plurality of association tuples; and using said aliased supplier reference as said effective supplier reference.

27. The computer program product of claim 22, wherein the determining further comprises:

determining that said client reference matches a parent entity of said supplier reference; and adding a new association tuple to said association graph, said new association tuple referencing said supplier reference and said container.

28. The computer program product of claim 22, wherein the determining further comprises:

determining that said client reference does not match a parent entity of the supplier reference;

creating a new alias supplier proxy for the resource; and adding a new association tuple to said association graph, said new association tuple referencing said new alias supplier proxy.

29. The computer program product of claim 21, further comprising:

creating a proxy to the resource, said proxy identified by a proxy identifier;

making the resource immutable; and providing said proxy identifier as said supplier reference.

30. The computer program product of claim 21, further comprising:

determining a right of the user to said effective supplier reference responsive to returning the effective supplier reference; and enabling an operation by the user on the supplier reference responsive to said right.

* * * * *

UNITED STATES PATENT AND TRADEMARK OFFICE
CERTIFICATE OF CORRECTION

PATENT NO.        : 8,245,271 B2                                              Page 1 of 1
APPLICATION NO.   : 11/839146
DATED             : August 14, 2012
INVENTOR(S)       : Chan et al.

It is certified that error appears in the above-identified patent and that said Letters Patent is hereby corrected as shown below:

In column 3, line 63, delete ",for" and insert -- , for --, therefor.

In column 10, line 23, delete ".SupplierD-rrr" and insert -- . SupplierD-rrr --, therefor.

In column 10, line 43, delete "$(n+_{1)}{}^{th}$" and insert -- $(n+1)^{th}$ --, therefor.

In column 18, line 26, delete "Msg" and insert -- Msg 1 --, therefor.

In column 18, line 51, delete "of"Msg1-109" and insert -- of "Msg1-109 --, therefor.

In column 21, line 32, in Claim 4, delete "the retrieving determining" and insert -- the determining --, therefor.

Signed and Sealed this
Sixth Day of November, 2012

David J. Kappos
*Director of the United States Patent and Trademark Office*